(12) United States Patent
Inoue et al.

(10) Patent No.: US 6,581,087 B1
(45) Date of Patent: Jun. 17, 2003

(54) FLOATING POINT ADDER CAPABLE OF RAPID CLIP-CODE GENERATION

(75) Inventors: Yoshitsugu Inoue, Hyogo (JP); Hiroyuki Kawai, Hyogo (JP); Junko Kobara, Hyogo (JP); Robert Streitenberger, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 526 days.

(21) Appl. No.: 09/620,472

(22) Filed: Jul. 20, 2000

(30) Foreign Application Priority Data

Dec. 17, 1999 (JP) .............................. 11-358871

(51) Int. Cl.$^7$ .............................. G06F 7/50; G06F 7/02; G06F 5/00
(52) U.S. Cl. ..................... 708/671; 708/505; 345/620
(58) Field of Search ................. 708/671, 505; 345/620

(56) References Cited

U.S. PATENT DOCUMENTS

| | | | | |
|---|---|---|---|---|
| 5,157,764 | A | | 10/1992 | Priem et al. ................ 395/157 |
| 5,495,434 | A | * | 2/1996 | Taniguchi ................... 708/671 |
| 5,638,500 | A | | 6/1997 | Donovan et al. ............ 395/134 |
| 6,005,590 | A | * | 12/1999 | Negishi et al. .............. 345/505 |
| 6,175,851 | B1 | * | 1/2001 | Iourcha et al. .............. 708/505 |
| 6,401,108 | B1 | * | 6/2002 | Van Nguyen ............... 708/671 |

FOREIGN PATENT DOCUMENTS

| | | |
|---|---|---|
| JP | 62-184576 | 8/1987 |
| JP | 8-69538 | 3/1996 |
| JP | 9-330419 | 12/1997 |

OTHER PUBLICATIONS

"Computer Graphics: Principles and Practice" by Foley et al., The Systems Programming Series, pp. 271–278 (1992).
"Rapid Computer Operation System", Hwang, Kindaika-gakusha, pp. 295–299 (1980) with partial English translation.
"Computer Architecture A Quantitative Approach" by Patterson et al., Morgan Kaufmann Publishers, Inc., pp. A–16–A–21 (1990).

* cited by examiner

Primary Examiner—David H. Malzahn
(74) Attorney, Agent, or Firm—McDermott, Will & Emery

(57) ABSTRACT

In a floating point adder adding received two floating point data together and subtracting one such data from the other, before their exponent parts are matched in digit by a digit match unit the two data have their exponent parts compared and also their fraction parts compared, and a result of each comparison and a sign of each data are used to code a relationship in magnitude between data corresponding to a clipping coordinate and the other data fed. A clip code generated depending on the previously obtained comparison results from exponent part and fraction part compare units, rather than depending on a zero flag according to a result of an addition or a subtraction and a sign of the result of the addition or the subtraction, can rapidly be generated without the circuit increased in scale.

13 Claims, 12 Drawing Sheets

US 6,581,087 B1

FLOATING POINT ADDER CAPABLE OF RAPID CLIP-CODE GENERATION

BACKGROUND OF THE INVENTION

1. Field of the Invention

The present invention relates generally to floating point adders providing an operation performed to compare floating point data in magnitude, and particularly to floating point adders effectively used in clipping in graphics processing.

2. Description of the Background Art

In computer graphics, a clipping is performed to determine whether a coordinate of an object to be displayed exists in a view volume for projective transformation, a displaying window for two-dimensional graphics, and the like. Such clipping is described for example by J. D. Foley et al., *Computer Graphics: Principles and Practice*, 1992, pp. 271–278, Addison-Wesley Publishing Company, Inc.

Clipping requires an operation performed to compare in magnitude a coordinate of an object to be displayed and a coordinate referred to to provide such clipping.

In general, in computer graphics, floating point data is used as a coordinate, and the coordinate's magnitude is determined by adding or subtracting the floating point data. Such floating point data is added or subtracted according to a process flow, such as described by K. Hwang, translated by Horikoshi, *Rapid Computer Operation System*, pp. 295–299, 1980, Kindaikagakusha, and David A. Patterson and John L. Hennessy, *Computer Architecture A Quantitative Approach*. pp. A-16 to A-21, 1990, Morgan Kaufmann Publishers, Inc.

Throughout the present application, operation devices capable of adding first and second data values together as well as those capable of subtracting the first data value from the second data value will also be referred to as an adder.

Conventionally, a clip code serving as an indicator indicating whether a coordinate of an object to be displayed exists within a displaying window, is generated by a floating point adder.

FIG. 11 is a block diagram for illustrating how a clip code is conventionally generated.

Referring to FIG. 11, conventionally a floating point adder 501 and a code generation unit 502 cooperate to generate a clip code CODE.

Floating point adder 501 includes a preprocessing unit 510 receiving an instruction FUNC indicative of operation type and floating point data X and W, a digit match unit 11 matching a digit of floating point data X and that of floating point data W, a fraction part operation unit 12 adding together a fraction part of floating point data X having the digit matched and that of floating point data W having the digit matched or subtracting the fraction part of one data from that of the other data, a normalization unit 13 normalizing a result of an operation performed by fraction part operation unit 12, and a postprocessing unit 14 responsive to an output from normalization unit 13 for outputting a flag FLAG and an operation result RES.

Code generation unit 502 receives from floating point adder 501 the flag FLAG containing a zero flag, a sign flag and the like and separately performs a logical operation on the zero flag, the sign flag and the like to generate clip code CODE.

FIG. 12 is a block diagram showing a configuration of preprocessing unit 510 shown in FIG. 11.

As shown in FIG. 12, preprocessing unit 510 includes an input verify unit 20 receiving instruction FUNC and two floating point data X and W and generating a special input flag SIF, an exponent part compare unit 21 comparing an exponent part ex of floating point data X and an exponent part ew of floating point data W with each other, a fraction part compare unit 22 comparing a fraction part fx of floating point data X and a fraction part fw of floating point data W with each other, and a select signal generator 24 receiving instruction FUNC, floating point data X and W, an output from exponent part compare unit 21 and an output from fraction part compare unit 22 to generate a select signal SEL for selecting either floating point data X or W to shift selected data to match the digit of floating point data X and that of floating point data W.

Exponent part compare unit 21 compares exponent parts ex and ew. If ex>ew then exponent part compare unit 21 sets a flag F (ex>ew) to 1. If exponent parts ex and ew match then exponent part compare unit 21 sets a flag F (ex==ew) to 1.

Fraction part compare unit 22 compares fraction parts fx and fw. If fx>fw then fraction part compare unit 22 sets a flag F (fx>fw) to 1.

If clipping is herein provided, floating point data X represents a coordinate of an object to be displayed and floating point data W represents a coordinate of a clipping window.

For example, if floating point data X is larger than floating point data W corresponding to a largest coordinate value forming a view volume then an object to be displayed is outside the view volume. As such, clip code CODE is 1. To generate such clip code CODE, initially a floating point subtraction of X−W is performed.

With such operation's result having a zero flag of Z and a sign flag of N, the FIG. 11 code generation unit 502 provides an NOR of Z and N to find that X>W and thus generate "1" as clip code CODE.

Clipping can also be provided via a dedicated hardware, as described in U.S. Pat. No. 5,157,764.

A conventional clip-code generation technique, as has been shown in FIGS. 11 and 12, initially performs a floating-point subtraction process and then uses an operation flag to generate a clip code. As such, the conventional method disadvantageously requires a long process time to generate a clip code. The technique using a dedicated hardware, however, requires disadvantageously increased hardware resources.

SUMMARY OF THE INVENTION

The present invention contemplates a floating point adder capable of rapidly generating a clip code while preventing the circuit from being increased in scale.

The present invention, as briefly described, is a floating point adder including a preprocessing unit, a digit match unit, an operation unit and a normalization unit.

The preprocessing unit receives first and second floating point data and outputs an exponent part comparison result and a fraction part comparison result and a clip code. The preprocessing unit includes an exponent part compare unit comparing an exponent part of the first floating point data and an exponent part of the second floating point data with each other and outputting the exponent part comparison result, a fraction part compare unit comparing a fraction part of the first floating point data and a fraction part of the second floating point data with each other and outputting the fraction part comparison result, and a clip code generation unit receiving the exponent part comparison result and the fraction part comparison result and generating the clip code.

The digit match unit refers to the fraction part comparison result and the exponent part comparison result to match a digit of the fraction part of the first floating point data and a digit of the fraction part of the second floating point data. The operation unit adds together the fraction parts of the first and second floating point data having their digits matched by the digit match unit. The normalization unit receives and normalizes a result of an operation performed by the operation unit.

In accordance with the present invention, in another aspect, is a floating point adder including a preprocessing unit, a digit match unit, an operation unit and a normalization unit.

The preprocessing unit receives first and second floating point data and outputs an exponent part comparison result and a fraction part comparison result and a clip code. The preprocessing unit includes an exponent part compare unit comparing an exponent part of the first floating point data and an exponent part of the second floating point data with each other and outputting the exponent part comparison result, a fraction part compare unit comparing a fraction part of the first floating point data and a fraction part of the second floating point data with each other and outputting the fraction part comparison result, an input verify unit verifying that the first floating point data does not match 0, and a clip code generation circuit receiving an output from the input verify unit and the exponent part of the first floating point data and generating the clip code. The digit match unit refers to the fraction part comparison result and the exponent part comparison result to match a digit of the fraction part of the first floating point data and a digit of the fraction part of the second floating point data. The operation unit adds together the fraction parts of the first and second floating point data having their digits matched by the digit match unit. The normalization unit receives and normalizes a result of an operation performed by the operation unit.

In accordance with the present invention in still another aspect a floating point adder is responsive to a received instruction for either generating a clip code for first floating point data or performing an operation with the first and second floating point data received as an input and includes a preprocessing unit, a digit match unit, an operation unit and a normalization unit. The preprocessing unit receives the first and second floating point data and outputs a first exponent part comparison result and a first fraction part comparison result and a clip code. The preprocessing unit includes: a first data switch unit receiving the first and second floating point data and first boundary data corresponding to one boundary of a clip window, and selecting the first and second floating point data as first and second input data, respectively, when the instruction directs the operation, and selecting the first floating point data and the first boundary data as the first input data and the second input data, respectively, when the instruction directs generating a clip code; a first exponent part compare unit comparing an exponent part of the first input data and an exponent part of the second input data with each other and outputting the first exponent part comparison result; a first fraction part compare unit comparing a fraction part of the first input data and a fraction part of the second input data with each other and outputting the first fraction part comparison result; and a clip code generation unit outputting the clip code depending on the first exponent part comparison result and the first fraction part comparison result. The digit match unit matches a digit of the fraction part of the first floating point data and a digit of the fraction part of the second floating point data depending on the first fraction part comparison result and the first exponent part comparison result. The operation unit performs an operation on the fraction parts of the first and second floating point data having the digits matched by the digit match unit. The normalization unit receives and normalizes a result of the operation performed by the operation unit.

In accordance with the present invention in still another aspect a floating point adder includes a plurality of processing circuits associated with a plurality of coordinate axes, respectively. Each processing circuit includes a preprocessing unit receiving first and second floating point data corresponding to the coordinate axis, and outputting an exponent part comparison result and a fraction part comparison result and a clip code. The preprocessing unit includes an exponent part compare unit comparing an exponent part of the first floating point data and an exponent part of the second floating point data with each other and outputting the exponent part comparison result, a fraction part compare unit comparing a fraction part of the first floating point data and a fraction part of the second floating point data with each other and outputting the fraction part comparison result, and a clip code generation unit outputting the clip code depending on a relationship in magnitude between the first floating point data and reference data corresponding to a clip window. The digit match unit matches a digit of the fraction part of the first floating point data and a digit of the fraction part of the second floating point data depending on the fraction part comparison result and the exponent part comparison result. The operation unit performs an operation on the fraction parts of the first and second floating point data having the digits matched by the digit match unit. The normalization unit receives and normalizes a result of the operation performed by the operation unit.

As such, a main advantage of the present invention is that a functional block for adding floating points together or subtracting one floating point from the other can be diverted to minimize the hardware required for generating a clip code.

Another advantage of the present invention is that a functional block for adding floating points together or subtracting one floating point from the other can be diverted to simultaneously and rapidly generate clip codes for clipping upper and lower limits for any clipping window.

Still another advantage of the present invention is that a functional block for adding floating point data together or subtracting one floating point data from the other can be diverted to rapidly generate clip codes for multiple clipping coordinate axes.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
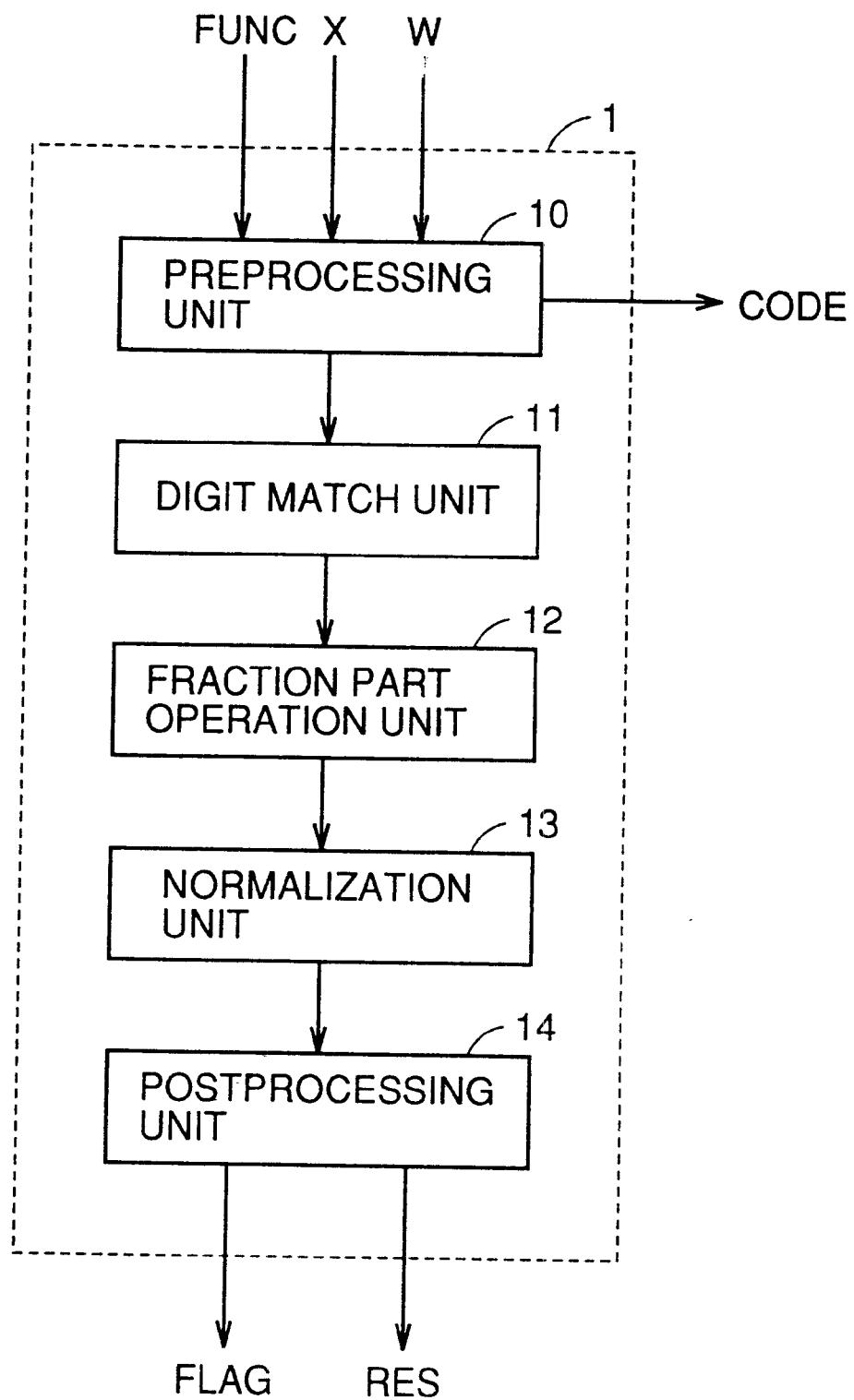
FIG. 1 is a block diagram showing a configuration of a floating point adder 1 of a first embodiment of the present invention.

Hereinafter the embodiments of the present invention will be described in greater detail with reference to the drawings. In the figures, identical reference characters denote identical or corresponding portions. The embodiments will be described exemplarily in a standardized floating-point representation, the IEEE-standardized, single-precision floating-point representation (ANSI/IEEE Std. 754–1985 "IEEE Standard for Binary Floating Point Arithmetic," New York: ANSI/IEEE, 1985).

First Embodiment

FIG. 1 is a block diagram showing a configuration of a floating point adder 1 of a first embodiment of the present invention.

As shown in FIG. 1, floating point adder 1 includes a preprocessing unit 10 which receives an instruction FUNC and two floating point data X and W and preprocesses the two floating point data and also outputs a clip code CODE, a digit match unit 11 which is responsive to an output of preprocessing unit 10 for matching a digit of floating point data X and that of floating point data Y, a fraction part operation unit 12 which adds and subtracts floating point data X and Y with their digits matched, a normalization unit 13 which receives and normalizes an operation result from fraction part operation unit 12, and a postprocessing unit 14 which receives and postprocesses an output of normalization unit 13 to output an operation flag FLAG and an operation result RES.

Figure 2:
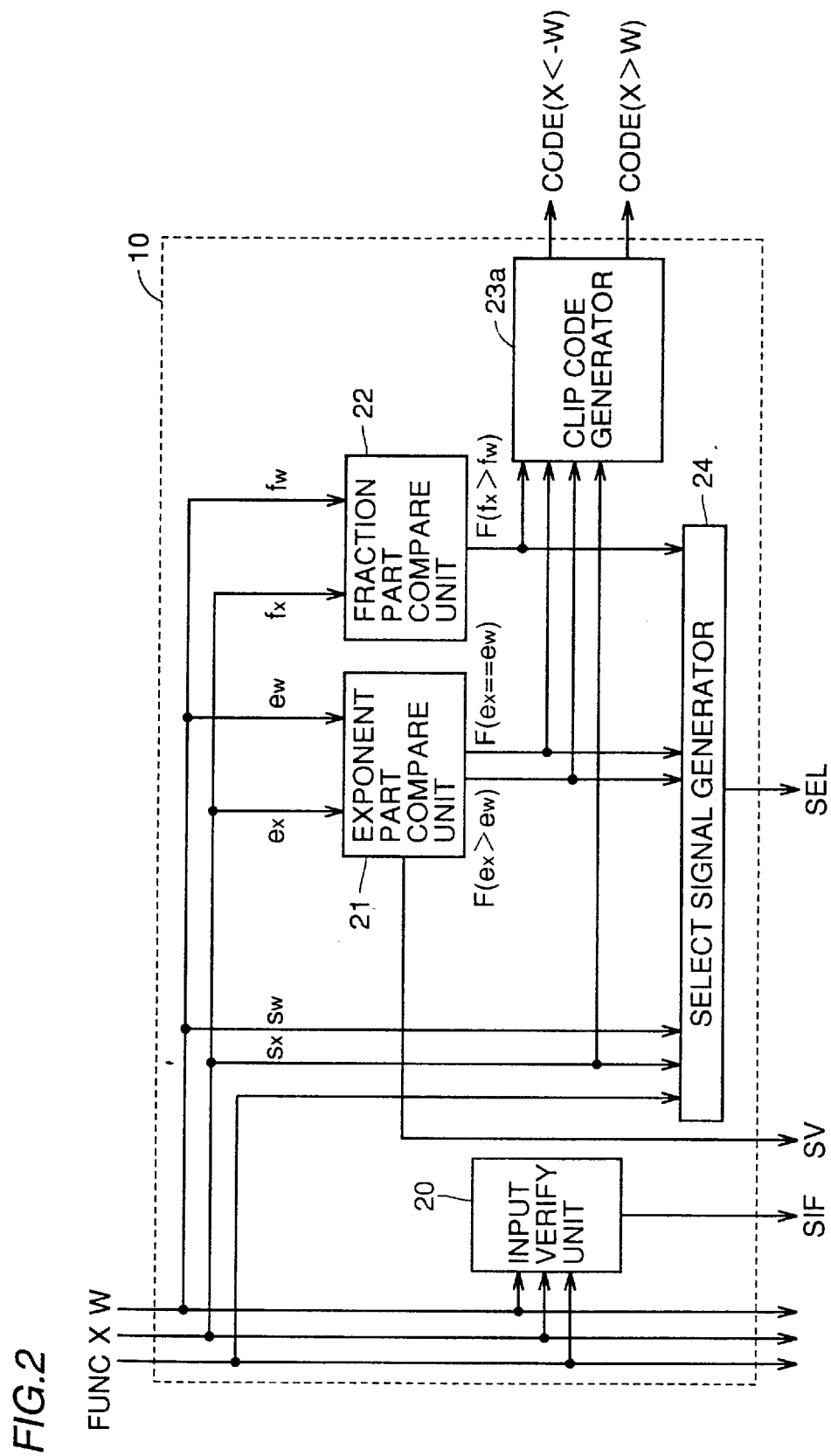
FIG. 2 is a block diagram showing a configuration of a preprocessing unit 10 shown in FIG. 1.

FIG. 2 is a block diagram showing a configuration of preprocessing unit 10 shown in FIG. 1.

As shown in FIG. 2, preprocessing unit 10 includes an input verify unit 20 which receives instruction FUNC and two floating point data X and W to generate a special input flag SIF, an exponent part compare unit 21 which compares an exponent part ex of floating point data X and an exponent part ew of floating point data W with each other, a fraction part compare unit 22 which compares a fraction part fx of floating point data X and a fraction part fw of floating point data W with each other, and a select signal generator 24 which receives instruction FUNC, floating point data X and W, an output from exponent part compare unit 21 and an output from fraction part compare unit 22 to produce a select signal SEL for selecting either floating point data X or W to shift the selected data to match the digits of floating point data X and Y.

Exponent part compare unit 21 compares exponent parts ex and ew with each other. If ex>ew, exponent part compare unit 21 sets a flag F (ex>ew) to 1. If exponent parts ex and ew match, exponent part compare unit 21 sets flag F (ex==ew) to 1.

Fraction part compare unit 22 compares fraction parts fx and fw with each other. If fx>fw, fraction part compare unit 22 sets a flag F (fx>fw) to 1.

Preprocessing unit 10 also includes a clip code generator 23a which receives a sign bit sx of floating point data X and flags F (ex>ew), F (ex==ew), F (fx>fw) and outputs clip codes CODE (X<-W), CODE (X>W).

Figure 3:
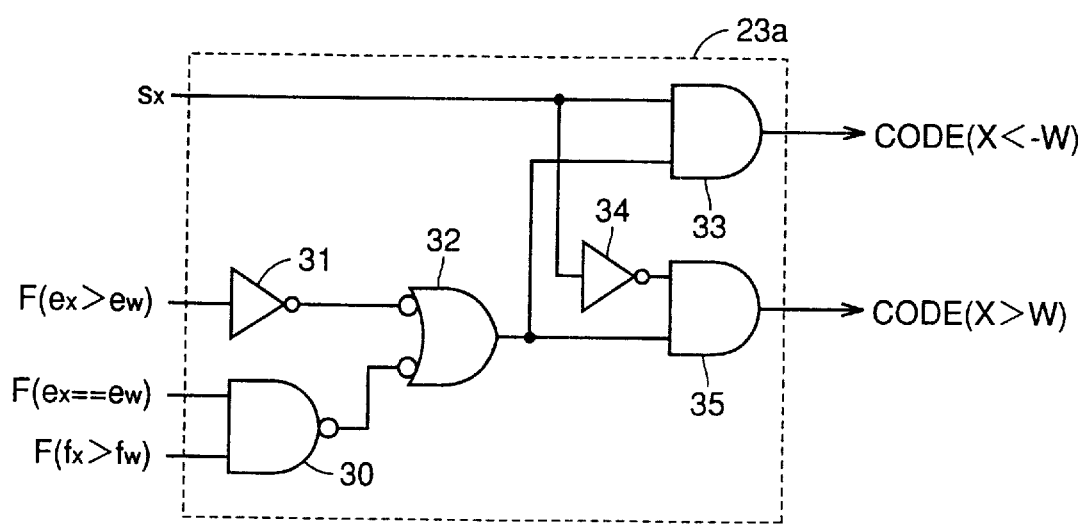
FIG. 3 is a circuit diagram showing a configuration of a clip code generator 23a shown in FIG. 2.

FIG. 3 is a circuit diagram showing a configuration of clip code generator 23a shown in FIG. 2.

As shown in FIG. 3, clip code generator 23a includes an inverter 31 receiving and inverting flag F (ex>ew), an NAND circuit 30 receiving flags F (ex==ew) and F (fx>fw), an NAND circuit 32 receiving an output from inverter 31 and that from NAND circuit 30, an AND circuit 33 receiving sign bit sx and an output from NAND circuit 32 and outputting clip code CODE (X<-W), an inverter 34 receiving and inverting sign bit sx, and an AND circuit 35 receiving an output from inverter 34 and the output from NAND circuit 32 and outputting clip code CODE (X>W).

In operation, as described with reference to FIGS. 2 and 3, the floating point adder receives instruction FUNC and floating point data X and W, which are in turn initially input to preprocessing unit 10 and checked by input verify unit 20 as to whether the input values are in a form representing a special numerical value in the floating point representation applied. For example, in an IEEE-standardized floating point representation, a value input with its exponent part's bits and fraction part's bits all being "0" represents a numerical value of zero, and a value input with its exponent part's bits all being "1" and its fraction part's bits all being "0" represents ∞. Input verify unit 20 verifies whether such special values as described above have been input.

Exponent part compare unit 21 compares exponent part ex of floating point data X and exponent part ew of floating point data W with each other. Fraction part compare unit 22 compares fraction part fx of floating point data X and fraction part fw of floating point data W.

Exponent part compare unit 21 outputs flag F (ex>ew) set to 1 when exponent part ex is larger than exponent part ew, and exponent part compare unit 21 outputs flag F (ex==ew) set to 1 when exponent part ex is equal to exponent part ew. Exponent part compare unit 21 also outputs a digit-matching shift value SV corresponding to a difference between exponent parts ex and ew. Digit-matching shift value SV is used as a shift value for matching one digit with another, applied to the FIG. 1 digit match unit 11 providing a subsequent processing in an addition or a subtraction.

Fraction part compare unit 22 outputs to select signal generator 24 and clip code generator 23a the flag F (fx>fw) set to 1 when fraction part fx is larger than fraction part fw.

Select signal generator 24 receives instruction FUNC, sign bits sx and sw of floating point data X and W, respectively, and the flags from exponent part compare unit 21 and fraction part compare unit 22 to determine which of floating point data X and W should be shifted for output to the FIG. 1 digit match unit 11 providing a subsequent processing in an addition or a subtraction.

For example, if floating point data X and W each have a positive value and they are added together, with ex>ew, select signal generator 24 selects fraction part fw as an input to be shifted, to refer to the exponent part of floating point data X to perform a subsequent process.

If floating point data X and W each have a positive value and a subtraction X−W is performed, with ex==ew, select signal generator 24, with a shift value of zero, does not shift data. It should be noted, however, that to prevent the fraction part subtraction result from having a negative value, select signal generator 24 controls the subsequent steps in the addition or the subtraction. More specifically, if fraction part compare unit 22 outputs a result fx<fw, then a subtraction W−X is performed and its sign is then inverted.

Clip code generator 23 constantly generates a clip code depending on floating point data X and W, regardless of instruction FUNC. Clip code generator 23a receives flags F (ex>ew), F (ex==ew), F (fx>fw) and sign bit sx of floating point data X. If floating point data W (note that W>0) is used as a clipping coordinate, clip code generator 23a outputs clip codes CODE (X<−W) and CODE(X>W).

CODE (X<−W) is a clip code set to 1 when X<−W, and CODE (X>W) is a clip code set to 1 when X>W. These clip codes are generated simultaneously and given in the following equations (1) and (2):

$$CODE\ (X<-W)=sx \cdot \{(ex>ew)+(ex==ew) \cdot (fx>fw)\} \quad (1)$$

$$CODE\ (X<W)=(!sx) \cdot \{(ex>ew)+(ex==ew) \cdot (fx>fw)\} \quad (2)$$

wherein sign bit sx is set to 0 when floating point data X has a positive value, "!" represents inversion, and (A==B) represents a logical value of "1" when A and B match.

As such, the floating point adder of the first embodiment, using exponent part and fraction part comparison result flags required for a normal floating point operation, only requires an additional circuit small in scale to rapidly generate a clip code for a clipping coordinate on each of the positive and negative sides equal in absolute value.

Second Embodiment

Figure 4:
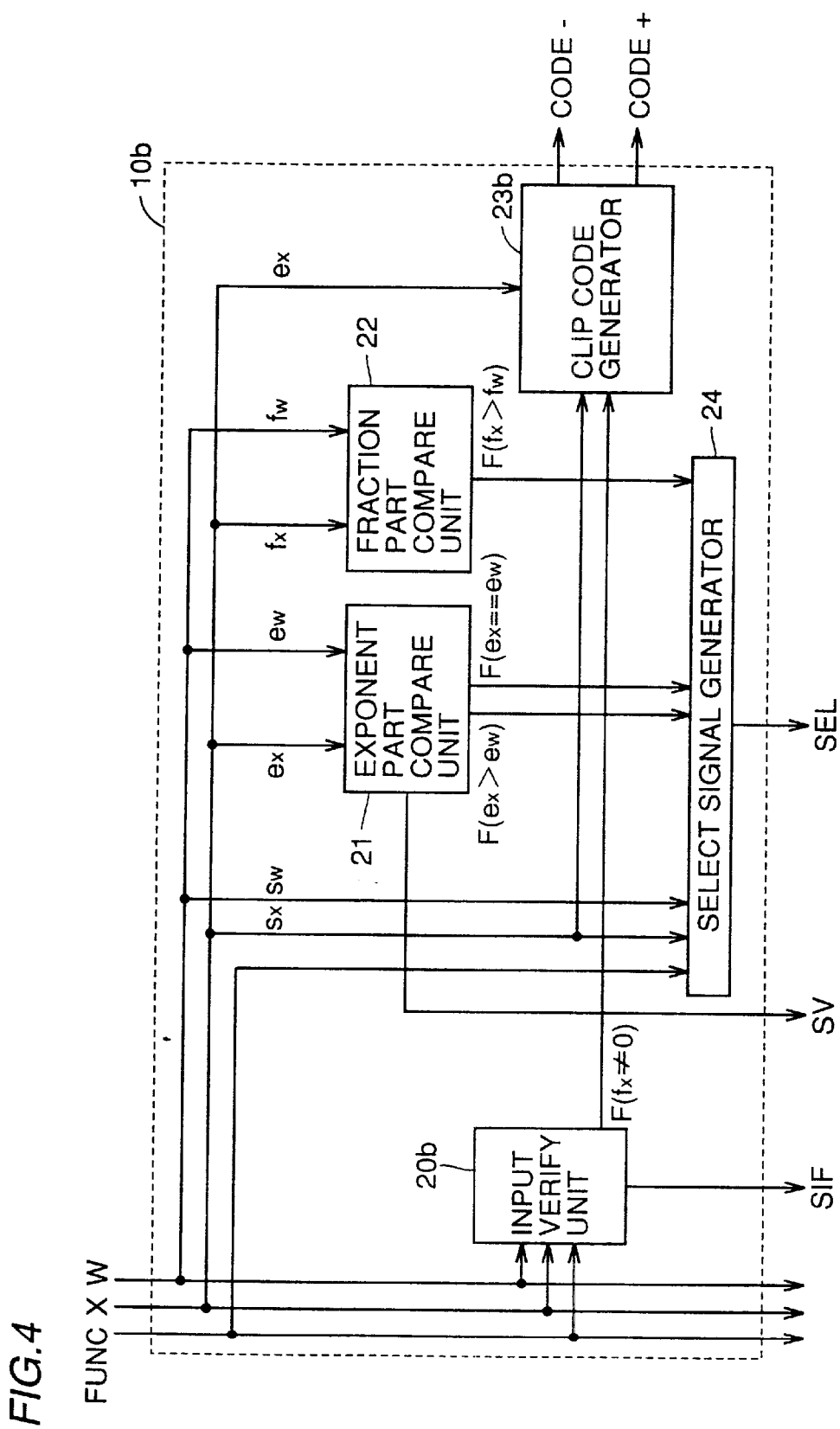
FIG. 4 is a block diagram showing a configuration of a preprocessing unit 10b used in a floating point adder of a second embodiment of the present invention.

FIG. 4 is a block diagram showing a configuration of a preprocessing unit 10b used in a floating point adder of a second embodiment of the present invention.

As shown in FIG. 4, preprocessing unit 10b is similar in configuration to the FIG. 2 preprocessing unit 10, except that a clip code generator 23b and an input verify unit 20b replace clip code generator 23a and input verify unit 20, respectively.

The input verify unit 20b function is similar to the FIG. 2 input verify unit 20 function, although input verify unit 20b also functions to output to clip code generator 23b a flag F(fx≠0) set to 1 if in the process a fraction part of floating point data X that is other than 0 is generated.

Figure 5:
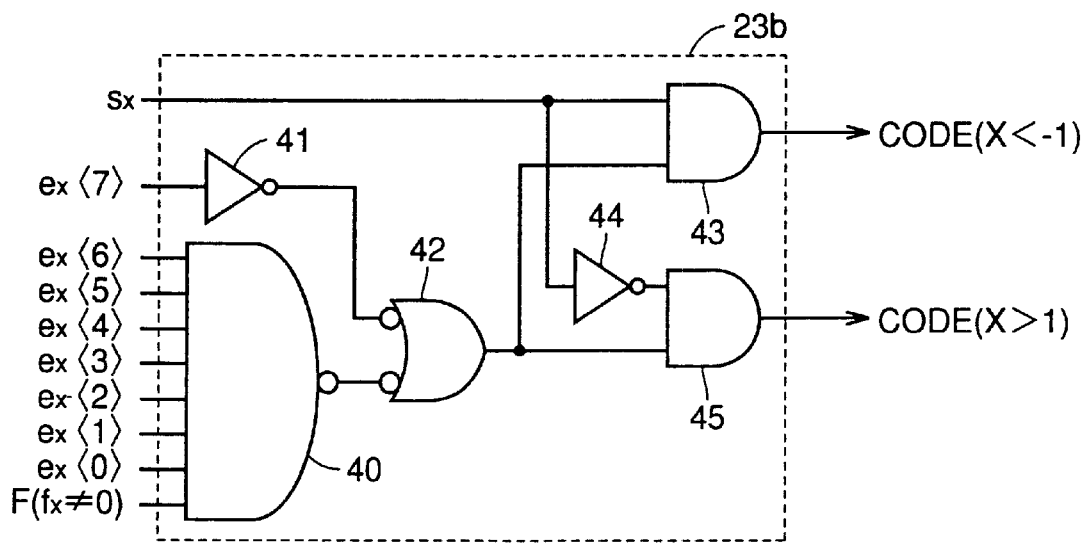
FIG. 5 is a circuit diagram showing a configuration of a clip code generator 23b shown in FIG. 4.

FIG. 5 is a circuit diagram showing a configuration of clip code generator 23b shown in FIG. 4.

As shown in FIG. 5, clip code generator 23b includes an NAND circuit 40 receiving an exponent part's bits ex<0> to ex<6> and flag F(fx≠0), an inverter 41 receiving and inverting an exponent part's bit ex<7>, an NAND circuit 42 receiving an output from inverter 41 and an output from NAND circuit 40, an AND circuit 43 receiving sign bit sx and an output from NAND circuit 42 and outputting a clip code CODE (X<−1), an inverter 44 receiving and inverting sign bit sx, and an AND circuit 45 receiving an output from inverter 44 and the output from NAND circuit 42 and outputting a clip code CODE (X>1).

Clip code generator 23b performs a logical operation on a fed numerical value's sign bit sx and exponent part ex and a flag from input verify unit 20a. Herein, single-precision floating point data is exemplarily used, wherein exponent part ex is represented in eight bits, with the most significant bit (MSB) and least significant bit (LSB) represented as ex<7> and ex<0>, respectively.

It should be noted that setting a clipping coordinate to ±W, fixing it at "±1" and the like are generally common techniques used in three-dimensional graphics processing.

In the invention according to the second embodiment, a clipping coordinate fixed to "±1" is used and clip code generator 23b verifies a relationship in magnitude between floating point data X input to the floating point adder and "±1" and "−1."

In an IEEE-standardized, single-precision floating-point numerical value representation, "1" corresponds in binary representation to an exponent part "01111111" and a fraction part "0." As such, with its sign considered, clip code CODE (X>1), set to 1 when floating point data X input to the floating point adder is larger than "±1," is given by the following logical expression:

$$CODE\ (X>1)=(!sx) \cdot \{ex<7>+(ex<6:0>==1111111) \cdot (fx \neq 0)\} \quad (3).$$

Clip code CODE (X<−1), set to "1" for floating point data X smaller than "−1," is given by the following logical expression:

$$CODE\ (X<-1)=sx \cdot \{ex<7>+(ex<6:0>==1111111) \cdot (fx \neq 0)\} \quad (4).$$

Expressions (3) and (4) implemented in the form of a logic gate correspond to the clip code generator shown in FIG. 5.

It should be noted that in the second embodiment also, a clip code is constantly generated depending on input floating point data X and W, regardless of instruction FUNC. The clip code is subject to a decision as to whether it is used by another operation unit which for example performs projective transformation.

As described above, the floating point adder of the second embodiment can generate a clip code through diversion of a result of verifying an input value's fraction part obtained from the input verify unit that is required for floating-point addition and subtraction operations. As such, without the circuit further increased in scale a clip code can rapidly be generated for a clipping coordinate of "±1."

Third Embodiment

Figure 6:
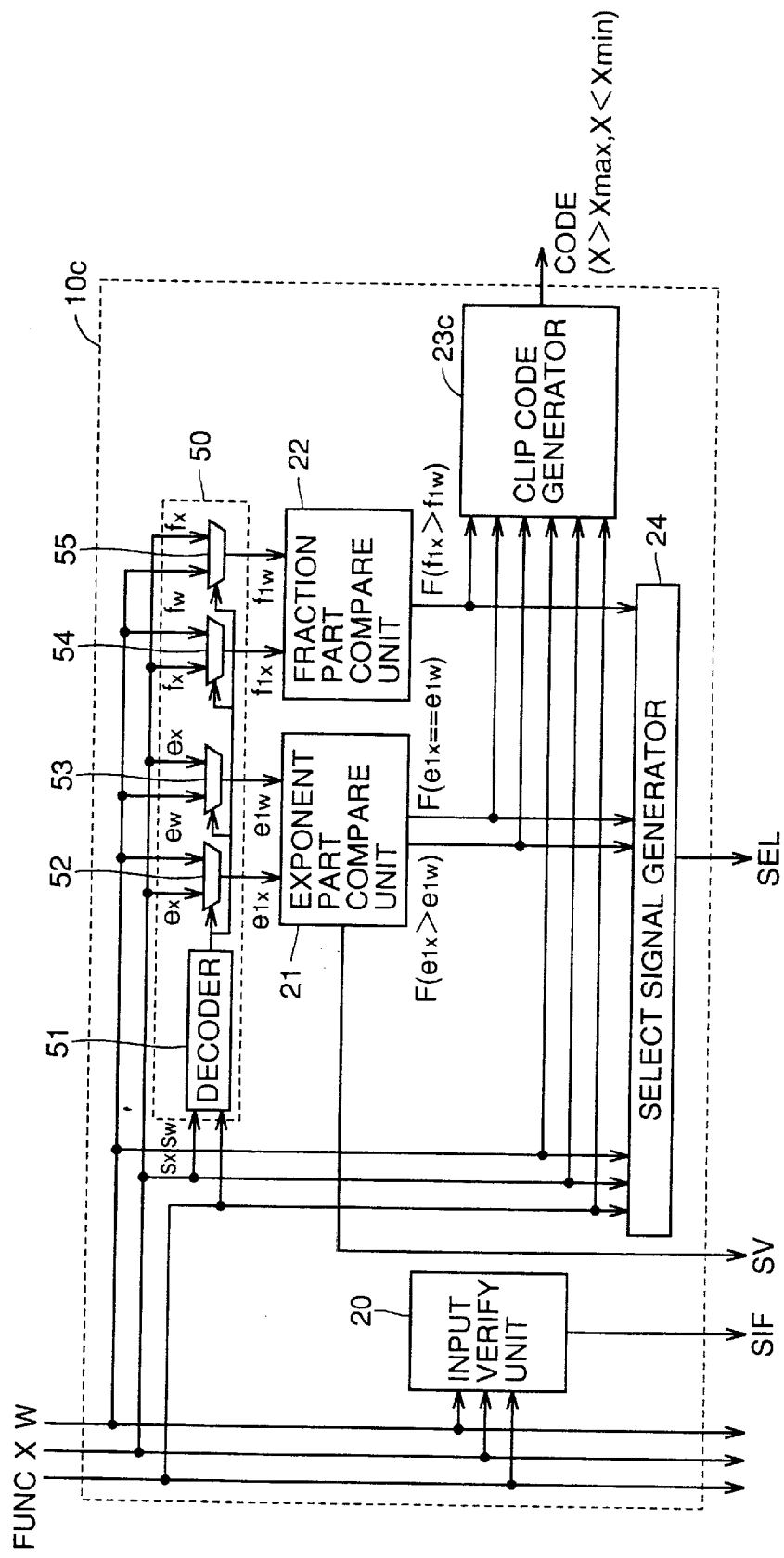
FIG. 6 is a block diagram showing a configuration of a preprocessing unit 10c used in a third embodiment of the present invention.

FIG. 6 is a block diagram showing a configuration of a preprocessing unit 10c used in a third embodiment of the present invention.

As shown in FIG. 6, preprocessing unit 10c has the FIG. 2 preprocessing unit 10 configuration plus a clip code generator 23c replacing clip code generator 23a and an input switch unit 50.

Exponent part compare unit 21 receives exponent parts e1x and e1w output from input switch unit 50, rather than exponent parts ex and ew. Fraction part compare unit 22 receives fraction parts f1x and f1w rather than fraction parts fx and fw.

Input switch unit 50 includes a decoder 51 receiving instruction FUNC and sign bit sx, a selector 52 responsive to an output from decoder 51 for outputting either exponent part ex or exponent part ew as exponent part e1x, a selector 53 responsive to the output from decoder 51 for outputting either exponent part ew or ex as exponent part e1w, a selector 54 responsive to the output from decoder 51 for outputting either fraction part fx or fw as fraction part f1x, and a selector 55 responsive to the output from decoder 51 for outputting either fraction part fw or fx as fraction part f1w.

The remainder of the preprocessing unit 10c configuration is similar to that of the FIG. 2 preprocessing unit 10 configuration and will thus not be described in detail.

Figure 7:
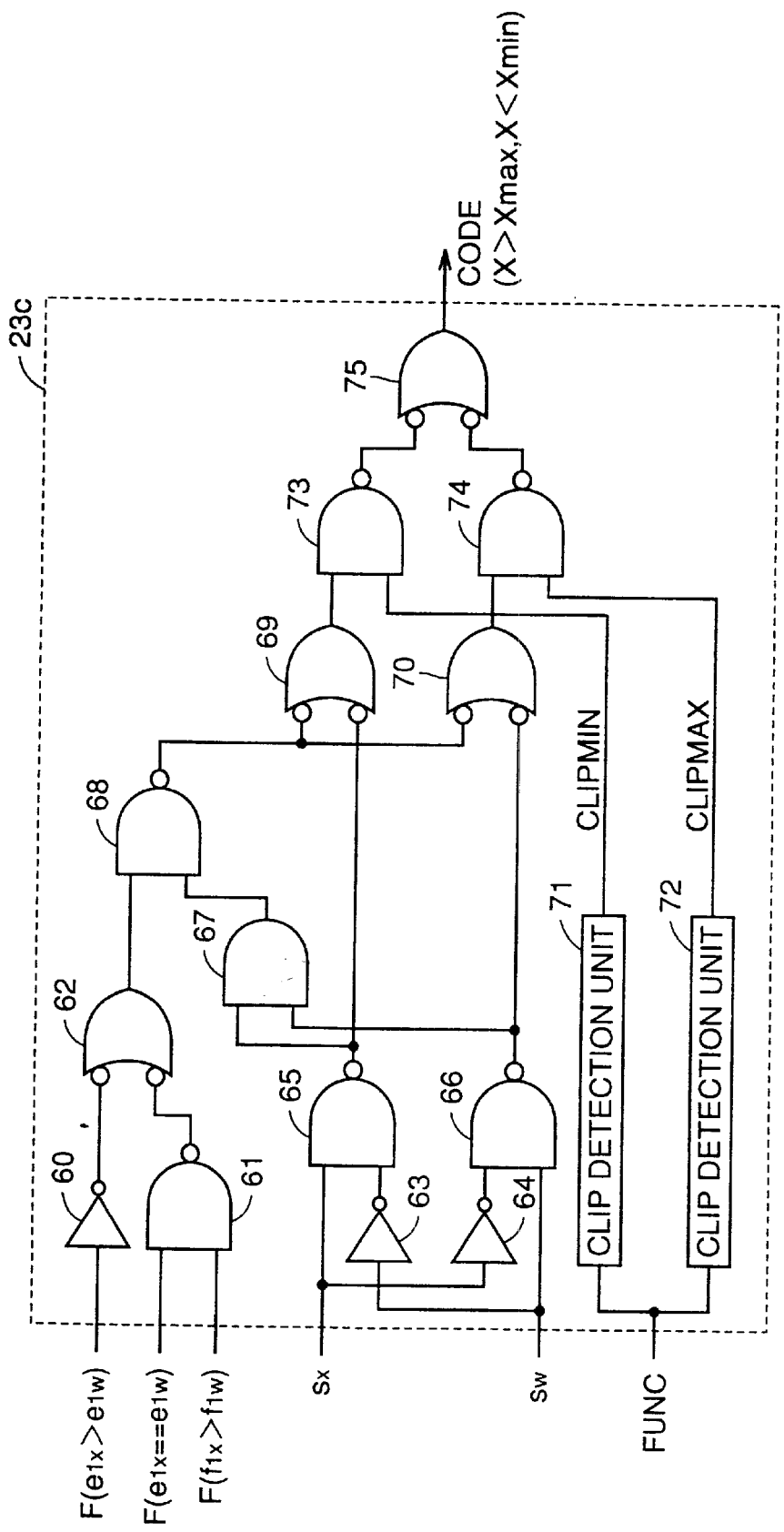
FIG. 7 is a circuit diagram showing a configuration of a clip code generator 23c shown in FIG. 6.

FIG. 7 is a circuit diagram showing a configuration of clip code generator 23c shown in FIG. 6.

As shown in FIG. 7, clip code generator 23c includes an inverter 60 receiving and inverting a flag F (e1x>e1w) output from the FIG. 6 exponent part compare unit 21, an NAND circuit 61 receiving flags F (e1x==e1w) and F (f1x>f1w), an NAND circuit 62 receiving an output from inverter 60 and that from NAND circuit 61, an inverter 63 receiving and inverting sign bit sw of floating point data W, an inverter 64 receiving and inverting sign bit sx of floating point data X, an NAND circuit 65 receiving sign bit sx and an output from inverter 63, an NAND circuit 66 receiving an output from inverter 64 and sign bit sw, an AND circuit 67 receiving an output from NAND circuit 65 and that from NAND circuit 66, and an NAND circuit 68 receiving an output from NAND circuit 62 and that from AND circuit 67.

Clip code generator 23c also includes an NAND circuit 69 receiving the output from NAND circuit 65 and an output from NAND circuit 68, an NAND circuit 70 receiving the outputs from NAND circuits 66 and 68, a clip detection unit 71 receiving instruction FUNC and outputting a signal CLIPMIN if it detects that instruction FUNC is an instruction to clip for a minimal value of a clipping window coordinate, a clip detection unit 72 receiving instruction FUNC and outputting a signal CLIPMAX if it detects that instruction FUNC is an instruction to clip for a maximal value of a clipping window coordinate, an NAND circuit 73 receiving an output from NAND circuit 69 and signal CLIPMIN, an NAND circuit 74 receiving an output from NAND circuit 70 and signal CLIPMAX, and an NAND circuit 75 receiving an output from NAND circuit 73 and that from NAND circuit 74 and outputting a clip code CODE (X>Xmax, X<Xmin).

In operation, as briefly described with reference to FIGS. 6 and 7, clip code generator 23c performs a logical operation on fed instruction FUNC, sign bits sx and sw and comparison-result flags to output a clip code depending on the instruction.

If instruction FUNC directs an addition or a subtraction, decoder 51 allows a selection of e1x, e1w, f1x, f1w, respectively corresponding to ex, ew, fx, fw input to exponent part compare unit 21 and fraction part compare unit 22 to allow clip code generator 23c to receive an input similar to that input to clip code generators 23a and 23b shown in FIGS. 2 and 4.

If instruction FUNC directs generating a clip code for a lower limit of a clipping coordinate, with sign bit sx being "0," i.e., input floating point data X having a positive value, then exponent part compare unit 21 and fraction part compare unit 22 receive data that are switched. In this example, ew, ex, fw, fx are selected as e1x, e1w, f1x, f1w, respectively.

Similarly, if instruction FUNC directs generating a clip code for an upper limit of a clipping coordinate, with sign bit sx being "1," i.e., input floating point data X having a negative value, then exponent and fraction part compare units 21 and 22 receive data that are switched.

When instruction FUNC received directs generating a clip code for a lower limit of a clipping coordinate, clip code generator 23c generates clip code CODE (X>Xmax, X<Xmin) set to 1 for X smaller than the clipping lower limit, by means of a logic circuit representing the following logical expression:

$$\text{CODE } (X{>}X\text{max}, X{<}X\text{min}) = sx \cdot (!sw) + (sx{==}sw) \cdot \{(e1x{>}e1w) + (e1x{==}e1w) \cdot (f1x{>}f1w)\} \quad (5).$$

When instruction FUNC received directs generating a clip code for an upper limit of a clipping coordinate, clip code generator 23c generates clip code CODE (X>Xmax, X<Xmin) set to 1 for input floating point data X larger than the clipping upper limit, by means of a logic circuit representing the following logical expression:

$$\text{CODE } (X{>}X\text{max}, X{<}X\text{min}) = (!sx) \cdot sw + (sx{==}sw) \cdot \{(e1x{>}e1w) + (e1x{==}e1w) \cdot (f1x{>}f1w)\} \quad (6).$$

As such, the floating point adder of the third embodiment can divert a functional block serving as an adder to minimize the hardware required for generating a clip code and also rapidly output for any clipping coordinate a clip code depending on the instruction received.

Fourth Embodiment

Figure 8:
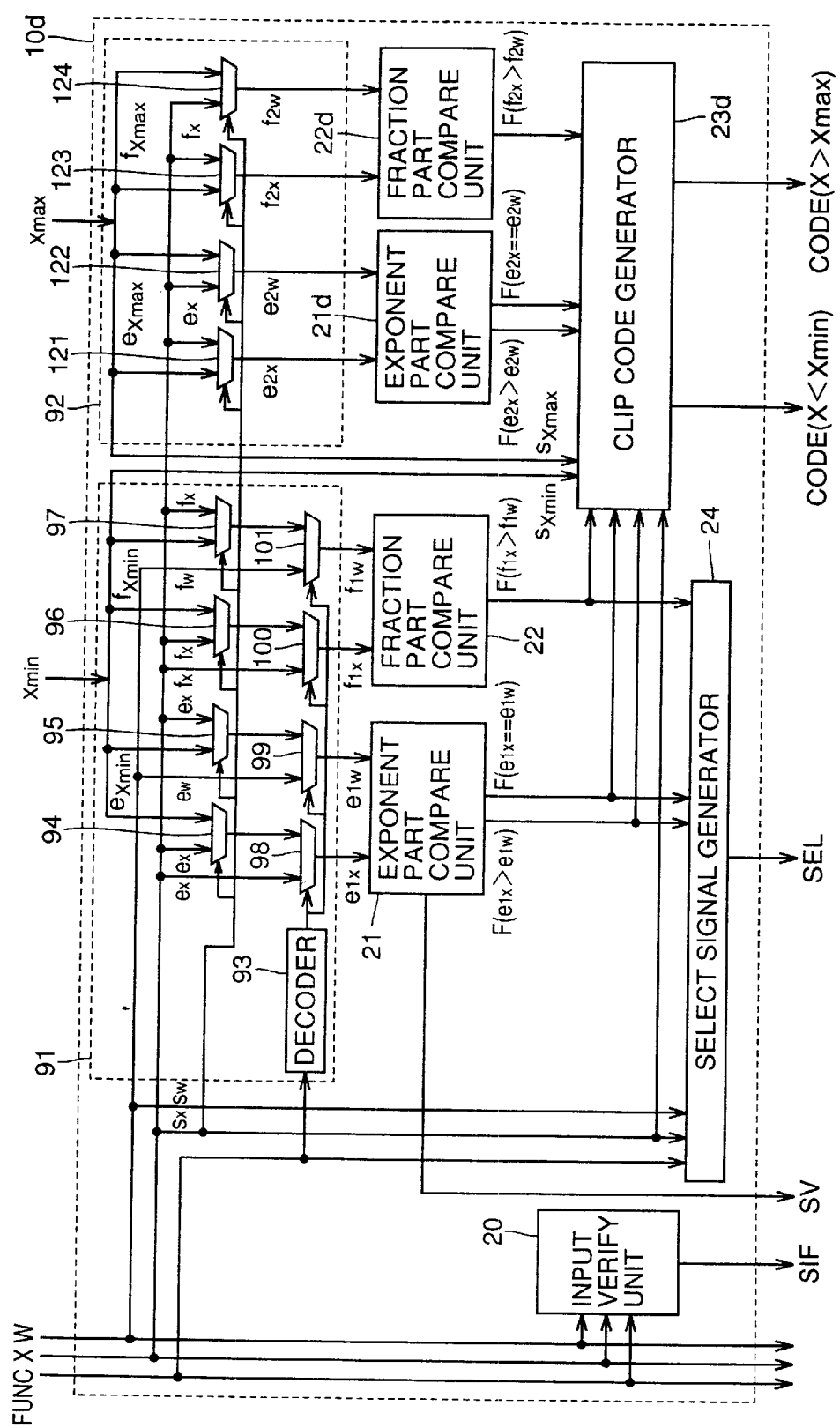
FIG. 8 is a block diagram showing a configuration of a preprocessing unit 10d used in a fourth embodiment of the present invention.

FIG. 8 is a block diagram showing a configuration of a preprocessing unit 10d used in a fourth embodiment of the present invention.

As shown in FIG. 8, preprocessing unit 10d has the FIG. 2 preprocessing unit 10 configuration with a clip code generator 23d replacing clip code generator 23a, plus input switch units 91 and 92 and exponent part and fraction part compare units 21d and 22d.

Input switch unit 91 includes a selector 94 responsive to sign bit sx for selecting and outputting either exponent part ex or exponent part $ex_{min}$ of lower limit data Xmin fed in clipping, a selector 95 responsive to sign bit sx for outputting either exponent part $ex_{min}$ or ex, a selector 96 responsive to sign bit sx for outputting either fraction part fx or a fraction part $fx_{min}$ of lower limit Xmin of a clipping coordinate, and a selector 97 responsive to sign bit sx for outputting either fraction part $fx_{min}$ or fx.

Input switch unit 91 also includes a decoder 93 receiving and decoding instruction FUNC, a selector 98 responsive to an output from decoder 93 for outputting either exponent part ex or an output from selector 94 as exponent part e1x, a selector 99 responsive to the output from decoder 93 for outputting either exponent part ew or an output from selector 95 as exponent part e1w, a selector 100 responsive to the output from decoder 93 for outputting either fraction part fx or an output from selector 96 as fraction part f1x, and a selector 101 responsive to the output from decoder 93 for outputting either fraction part fw or an output from selector 97 as fraction part f1w.

Input switch unit 91 outputs thus-selected exponent parts e1x and e1w to exponent part compare unit 21 and thus-selected fraction parts f1x and f1w to fraction part compare unit 22.

Input switch unit 92 includes a selector responsive to sign bit sx for outputting either an exponent part $ex_{max}$ of upper limit Xmax of a clipping coordinate or exponent part ex as an exponent part e2x, a selector 122 responsive to sign bit sx for outputting either exponent part ex or $ex_{max}$ as an exponent part e2w, a selector 123 responsive to sign bit sx for outputting a fraction part $fx_{max}$ of upper limit Xmax of a clipping coordinate or fraction part fx as a fraction part f2x, and a selector 124 responsive to sign bit sx for outputting either fraction part fx or $fx_{max}$ as a fraction part f2w.

Exponent part compare unit 21d receives exponent parts e2x and e2w and outputs flags F (e2x>e2w) and F (e2x==e2w).

Fraction part compare unit 22d receives fraction parts f2x and f2w and outputs a flag F (f2x>f2w).

Figure 9:
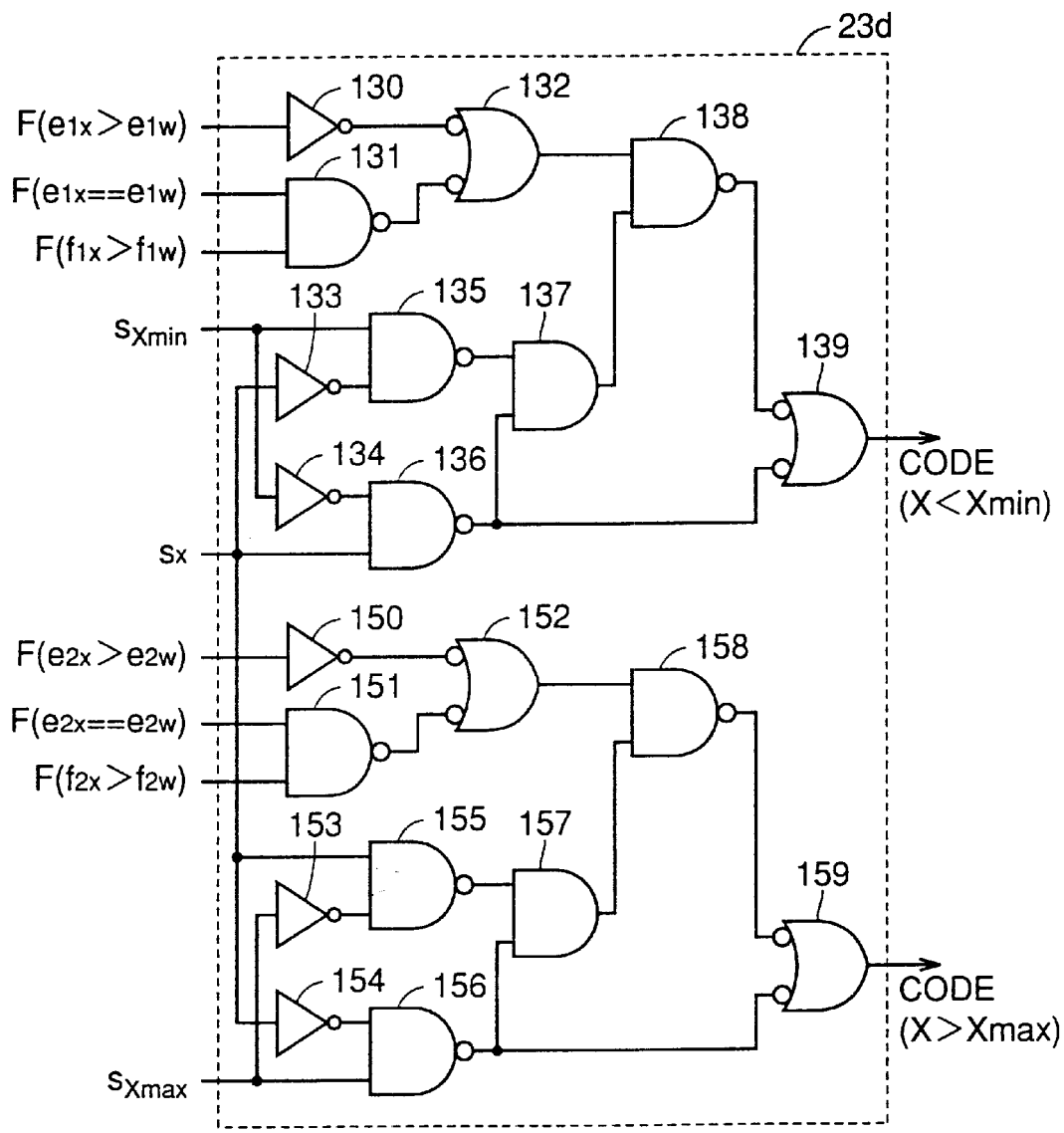
FIG. 9 is a circuit diagram showing a configuration of a clip code generator 23d shown in FIG. 8.

FIG. 9 is a circuit diagram showing a configuration of clip code generator 23d shown in FIG. 8.

As shown in FIG. 9, clip code generator 23d includes an inverter 130 receiving and inverting flag F (e1x>e1w), an NAND circuit 131 receiving flags F (e1x==e1w) and F (f1x>f1w), an NAND circuit 132 receiving an output from inverter 130 and that from NAND circuit 131, an inverter 134 receiving and inverting a sign bit $sx_{min}$ of lower limit Xmin of a clipping coordinate, an inverter 133 receiving and inverting sign bit sx, an NAND circuit 135 receiving an output from inverter 133 and sign bit $sx_{min}$, an NAND circuit 136 receiving an output from inverter 134 and sign bit sx, an AND circuit 137 receiving an output from NAND circuit 135 and that from NAND circuit 136, an NAND circuit 138 receiving an output from NAND circuit 132 and that from AND circuit 137, and an NAND circuit 139 receiving the output from NAND circuit 136 and an output from NAND circuit 138 and outputting a clip code CODE (X<Xmin).

Clip code generator 23d also includes an inverter 150 receiving and inverting flag F (e2x>e2w), an NAND circuit 151 receiving flags F (e2x==e2w) and F (f2x>f2w), an NAND circuit 152 receiving an output from inverter 150 and that from NAND circuit 151, an inverter 153 receiving and inverting sign bit $sx_{max}$ of upper limit Xmax of a clipping coordinate, an inverter 154 receiving and inverting sign bit sx, an NAND circuit 155 receiving an output from inverter 153 and sign bit sx, an NAND circuit 156 receiving an output from inverter 154 and sign bit $sx_{max}$, an AND circuit 157 receiving an output from NAND circuit 155 and that from NAND circuit 156, an NAND circuit 158 receiving an output from NAND circuit 152 and that from AND circuit 157, and an NAND circuit 159 receiving the output from NAND circuit 156 and an output from NAND circuit 158 and outputting clip code CODE (X>Xmax).

In operation, as briefly described with reference to FIGS. 8 and 9, for instruction FUNC directing an addition or a subtraction, ex, ew, fx, fw are selected as e1x, e1w, f1x, f1w, respectively, to allow exponent part and fraction part compare units 21 and 22 to receive the same inputs as the FIG. 2 exponent part and fraction part compare units 21 and 22.

If instruction FUNC directs generating a clip code, then input switch unit 91 provides a selection to allow exponent part compare unit 21 and fraction part compare unit 22 to independently and in parallel compare separately, externally input lower limit Xmin of a clipping coordinate with floating point data X input, and input switch unit 92 also provides a selection to allow exponent part compare unit 21d and fraction part compare unit 22d to independently and in parallel compare separately, externally input upper limit Xmax of the clipping coordinate with floating point data X input.

With a clip code instruction received, if input floating point data X has sign bit sx of "1" or floating point data X has a negative value, then exponent part compare unit 21 and fraction part compare unit 22 receive inputs that are switched. More specifically, input switch unit 91 selects $ex_{min}$, ex, $fx_{min}$, fx as e1x, e1w, f1x, f1w, respectively.

Otherwise, input switch unit 91 selects ex, $ex_{min}$, fx, $fx_{min}$ as e1x, e1w, f1x, f1w.

Exponent part compare unit 21d and fraction part compare unit 22d receive switched inputs when floating point data X has sign bit sx of "0" or floating point data X has a positive value. More specifically, input switch unit 92 selects $ex_{max}$, ex, $fx_{max}$, fx as e2x, e2w, f2x, f2w, respectively.

Otherwise, input switch unit 92 selects ex, $ex_{max}$, fx, $fx_{max}$ as e2x, e2w, f2x, f2w, respectively.

Clip code generator 23d receives e1x–e1w comparison result flags F (e1x>e1w) and F (e1x==e1w), e2x–e2w comparison result flags F (e2x>e2w) and F (e2x==e2w), f1x–f1w comparison result flag F (f1x>f1w), f2x–f2w comparison result flag F (f2x>f2w), and sign bits sx, $sx_{min}$, $sx_{max}$.

Clip code generator 23d generates clip code CODE (X<Xmin) set to "1" for input floating point data X smaller than clipping lower limit Xmin, by means of a logic circuit implementing the following logical expression:

$$\text{CODE } (X<X\text{min})=sx\cdot(!sx_{min})+(sx==sx_{min})\cdot\{(e1x>e1w)+(e1x==e1w)\cdot(f1x>f1w)\} \quad (7).$$

Clip code generator 23d also generates simultaneously a clip code for an upper limit of the clipping coordinate, i.e., clip code CODE (X>Xmax) set to 1 for input floating point data X larger than the clipping upper limit, by means of a logic circuit implementing the following logical expression:

$$\text{CODE } (X>X\text{max})=(!sx)\cdot sx_{max}+(sx==sx_{max})\cdot\{(e2x>e2w)+(e2x==e2w)\cdot(f2x>f2w)\} \quad (8).$$

As such, a clip code for an upper limit of any clipping coordinate and that for a lower limit thereof can be simultaneously obtained. Thus, for any clipping window a clip code can be output further rapidly.

Fifth Embodiment

Figure 10:
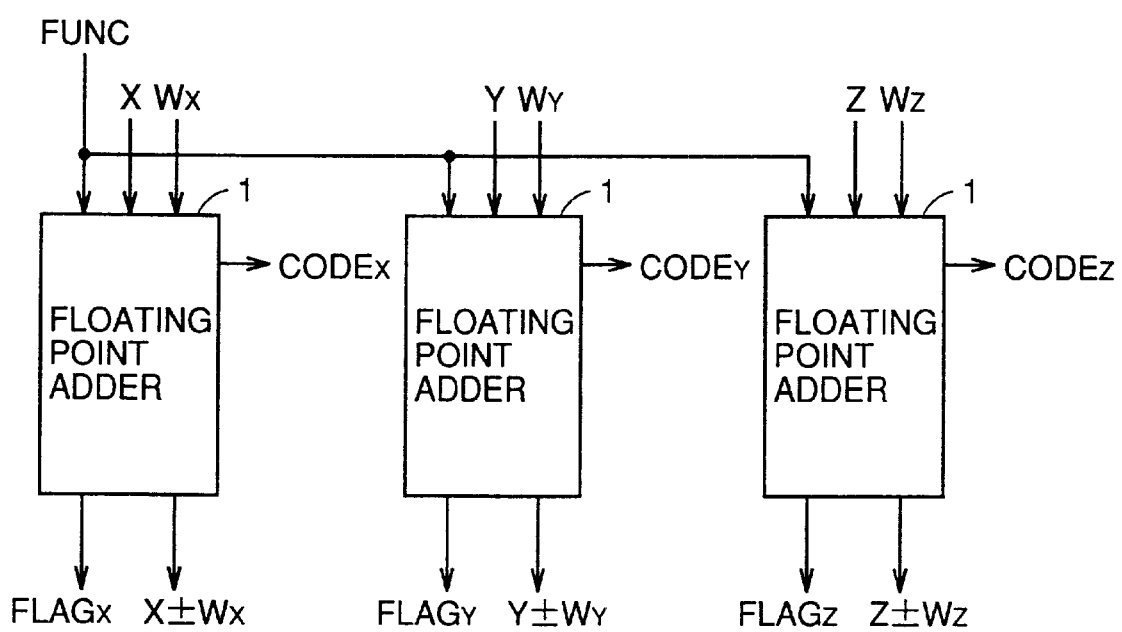
FIG. 10 is a block diagram for illustrating floating point adders according to a fifth embodiment of the present invention.
Figure 11:
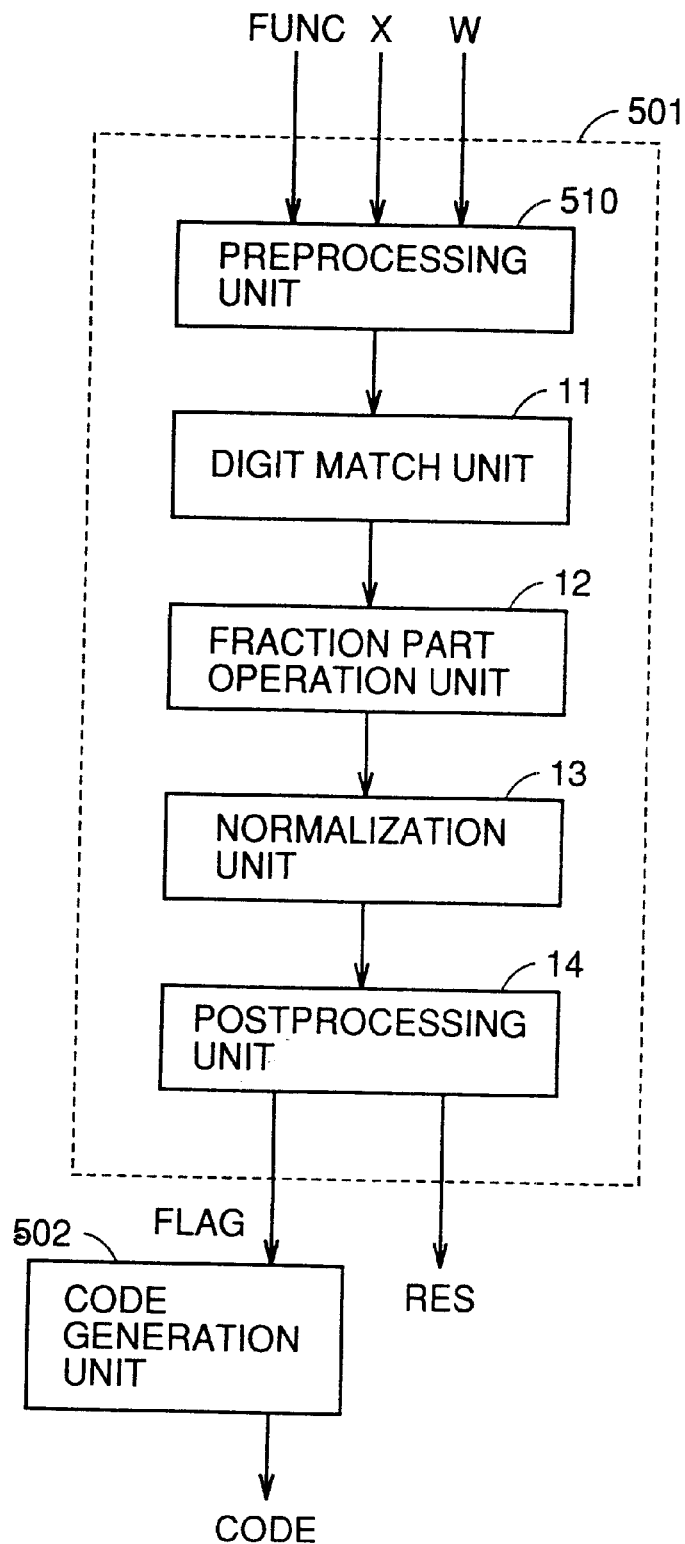
FIG. 11 is a block diagram for illustrating how a clip code is conventionally generated.
Figure 12:
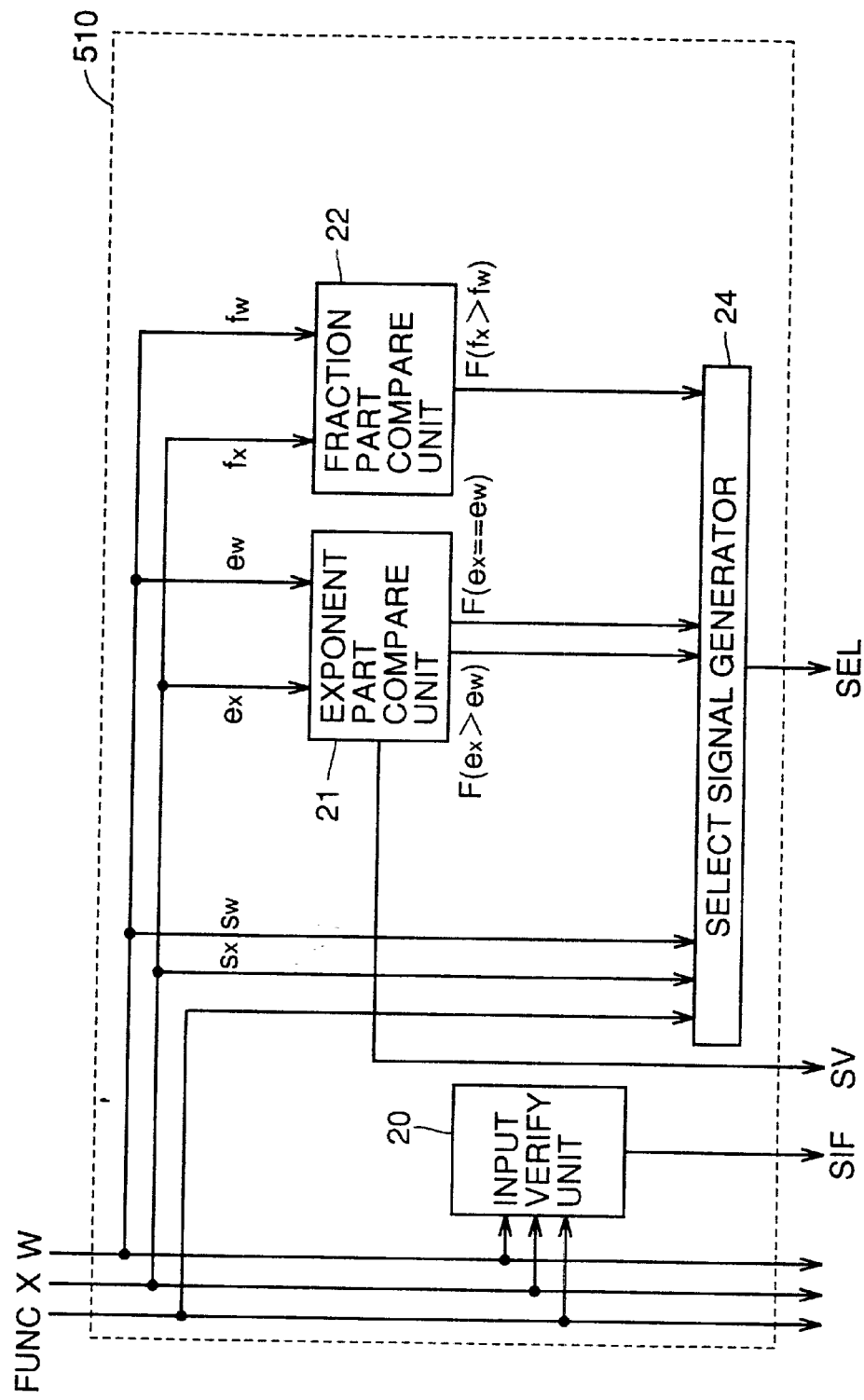
FIG. 12 is a block diagram showing a configuration of a preprocessing unit 510 shown in FIG. 11.

FIG. 10 is a block diagram for illustrating floating point adders according to a fifth embodiment of the present invention.

As shown in FIG. 10, three floating point adders 1 are arranged in parallel, each, as has been shown in FIG. 1, having therein a preprocessing unit comparing two input floating point data to generate a clip code. Each floating point adder receives the same instruction FUNC, and adds or subtracts three different pairs of input numerical values and generates a clip code.

In generating a clip code, with coordinate axes x, y, z associated with a clipping-coordinate's absolute values $W_X$, $W_Y$, $W_Z$ and clip-determined coordinate values X, Y, Z, comparing X with $W_X$, Y with $W_Y$, and Z with $W_Z$ allow their respective clip codes to be generated simultaneously.

As such, clip codes for multiple clipping-coordinate axes can rapidly be generated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A floating point adder comprising:
   a preprocessing unit receiving first and second floating point data and outputting an exponent part comparison result and a fraction part comparison result and a clip code, said preprocessing unit including
   an exponent part compare unit comparing an exponent part of said first floating point data and an exponent part of said second floating point data with each other and outputting said exponent part comparison result, a fraction part compare unit comparing a fraction part of said first floating point data and a fraction part of said second floating point data with each other and outputting said fraction part comparison result, and a clip code generation unit receiving the exponent part comparison result and the fraction part comparison result and generating the clip code;

a digit match unit matching a digit of the fraction part of said first floating point data and a digit of the fraction part of said second floating point data depending on said fraction part comparison result and said exponent part comparison result;

an operation unit adding together the fraction parts of said first and second floating point data having the digits matched by said digit match unit; and a normalization unit receiving and normalizing an operation result output from said operation unit.

2. The floating point adder according to claim 1, wherein:

said exponent part comparison result includes a first signal indicating that the exponent part of said first floating point data is larger than the exponent part of said second floating point data, and a second signal indicating that the exponent parts of said first and second floating point data match;

said fraction part comparison result includes a third signal indicating that the fraction part of said first floating point data is larger than the fraction part of said second floating point data;

said reference data includes said first, second and third signals; and said clip code generation unit includes a logical operation unit providing a logical product of said second and third signals and outputting a logical sum of said logical product and said first signal.

3. The floating point adder according to claim 2, wherein said clip code includes first and second clip codes, and said clip code generation unit also includes a gate unit outputting the first clip code in response to an output from said logical operation unit when said first floating point data has a sign bit representing a positive value, and outputting the second clip code in response to the output from said logical operation unit when said first floating point data has said sign bit representing a negative value.

4. The floating point adder according to claim 1, responsive to a received instruction for outputting, as said clip code, either one of a first clip code for a lower limit of a clip window corresponding to said second floating point data and a second clip code for an upper limit of the clip window, wherein:

said preprocessing unit also includes a data switch unit outputting the exponent parts of said first and second floating point data as first and second exponent part data, respectively, and the fraction parts of said first and second floating point data as first and second fraction part data, respectively, when said instruction directs outputting said first clip code, and outputting the exponent parts of said first and second floating point data as said second and first exponent part data, respectively, and the fraction parts of said first and second floating point data as said second and first fraction part data, respectively, when said instruction directs outputting said second clip code;

said exponent part comparison result includes a first signal indicating that said first exponent part data is larger than said second exponent part data, and said second signal indicating that said first and second exponent part data match;

said fraction part comparison result includes a third signal indicating that said first fraction part data is larger than said second fraction part data;

said reference data includes said first, second and third signals; and said clip code generation unit includes a logical operation unit providing a logical product of said second and third signals and outputting a logical sum of said logical product and said first signal.

5. The floating point adder according to claim 4, said data switch unit includes:

a decoder receiving and decoding said instruction;

a first select circuit receiving the exponent parts of said first and second floating point data, responsive to an output from said decoder for selecting either one of the exponent parts of said first and second floating point data and outputting a selected exponent part as said first exponent part data;

a second select circuit receiving the exponent parts of said first and second floating point data, responsive to said output from said decoder for providing a selection complementary to that provided by said first select circuit and outputting the selection as said second exponent part data;

a third select circuit receiving the fraction parts of said first and second floating point data, responsive to said output from said decoder for selecting either one of the fraction parts of said first and second floating point data and outputting a selected fraction part as said first fraction part data; and a fourth select circuit receiving the fraction parts of said first and second floating point data, responsive to said output from said decoder for providing a selection complementary to that provided by said third select circuit and outputting the selection as said second fraction part data.

6. The floating point adder according to claim 1, wherein said operation unit is responsive to a received instruction for subtracting one from the other of the fraction parts of said first and second floating point data having the digits matched by said digit match unit.

7. A floating point adder comprising:

a preprocessing unit receiving first and second floating point data and outputting an exponent part comparison result and a fraction part comparison result and a clip code, said preprocessing unit including an exponent part compare unit comparing an exponent part of said first floating point data and an exponent part of said second floating point data with each other and outputting said exponent part comparison result, a fraction part compare unit comparing a fraction part of said first floating point data and a fraction part of said second floating point data with each other and outputting said fraction part comparison result, an input verify unit verifying that said first floating point data does not match 0, and a clip code generation unit receiving an output from said input verify unit and the exponent part of said first floating point data and generation said clop code;

a digit match unit matching a digit of the fraction part of said first floating point data and a digit of the fraction part of said second floating point data depending on said fraction part comparison result and said exponent part comparison result;

an operation unit adding together the fraction parts of said first and second floating point data having the digits matched by said digit match unit; and a normalization unit receiving and normalizing an operation result output from said operation unit.

8. The floating point adder according to claim 7, wherein said clip code generation unit includes a logical operation unit receiving an output from said input verify unit and the exponent part of said first floating point data to detect whether said first floating point data has an absolute value larger than 1.

9. The floating point adder according to claim 8, wherein said clip code generation unit also includes a gate unit outputting a first clip code in response to an output from said logical operation unit when said first floating point data has a sign bit representing a positive value, and outputting a second clip code in response to the output from said logical operation unit when said first floating point data has said sign bit representing a negative value.

10. A floating point adder responsive to a received instruction for either one of generating a clip code for first floating point data and performing an operation with said first and second floating point data received as an input, comprising:

a preprocessing unit receiving first and second floating point data and outputting a first exponent part comparison result and a first fraction part comparison result and a clip code, said preprocessing unit including a first data switch unit receiving said first and second floating point data and first boundary data corresponding to one boundary of a clip window, and selecting said first and second floating point data as first and second input data, respectively, when said instruction directs performing said operation, and selecting said first floating point data and said first boundary data as said first input data and said second input data, respectively, when said instruction directs generating said clip code, a first exponent part compare unit comparing an exponent part of said first input data and an exponent part of said second input data with each other and outputting said first exponent part comparison result, a first fraction part compare unit comparing a fraction part of said first input data and a fraction part of said second input data with each other and outputting said first fraction part comparison result, and a clip code generation unit outputting said clip code depending on said first exponent part comparison result and said first fraction part comparison result;

a digit match unit matching a digit of the fraction part of said first floating point data and a digit of the fraction part of said second floating point data depending on said first fraction part comparison result and said first exponent part comparison result;

an operation unit performing said operation on the fraction parts of said first and second floating point data having the digits matched by said digit match unit; and a normalization unit receiving and normalizing a result of the operation output from said operation unit.

11. The floating point adder according to claim 10, wherein said preprocessing unit includes a second exponent part compare unit comparing an exponent part of said first floating point data and an exponent part of second boundary data corresponding to the other boundary of the clip window with each other and outputting a second exponent part comparison result, a second fraction part compare unit comparing a fraction part of said first floating point data and a fraction part of said second boundary data with each other and outputting a second fraction part comparison result, and said clip code generation unit outputting said clip code depending on said second exponent part comparison result and said second fraction part comparison result.

12. The floating point adder according to claim 10, wherein:

said instruction includes an addition instruction and a subtraction instruction; and said operation unit is responsive to said instruction for performing said operation on the fraction parts of said first and second floating point data.

13. A floating point adder comprising a plurality of processing circuits associated with a plurality of coordinate axes, respectively, each said processing circuit including:

a preprocessing unit receiving first and second floating point data corresponding to said coordinate axis, and outputting an exponent part comparison result and a fraction part comparison result and a clip code, said preprocessing unit having an exponent part compare unit comparing an exponent part of said first floating point data and an exponent part of said second floating point data with each other and outputting said exponent part comparison result, a fraction part compare unit comparing a fraction part of said first floating point data and a fraction part of said second floating point data with each other and outputting said fraction part comparison result, and a clip code generation unit outputting said clip code depending on a relationship in magnitude between said first floating point data and reference data corresponding to a clip window;

a digit match unit matching a digit of the fraction part of said first floating point data and a digit of the fraction part of said second floating point data depending on said fraction part comparison result and said exponent part comparison result;

an operation unit performing an operation on the fraction parts of said first and second floating point data having the digits matched by said digit match unit; and a normalization unit receiving and normalizing a result of the operation output from said operation unit.

* * * * *